April 14, 1970
J. E. JOHANSON ET AL
3,506,894
DUAL-DIELECTRIC CAPACITOR
Filed Oct. 23, 1968
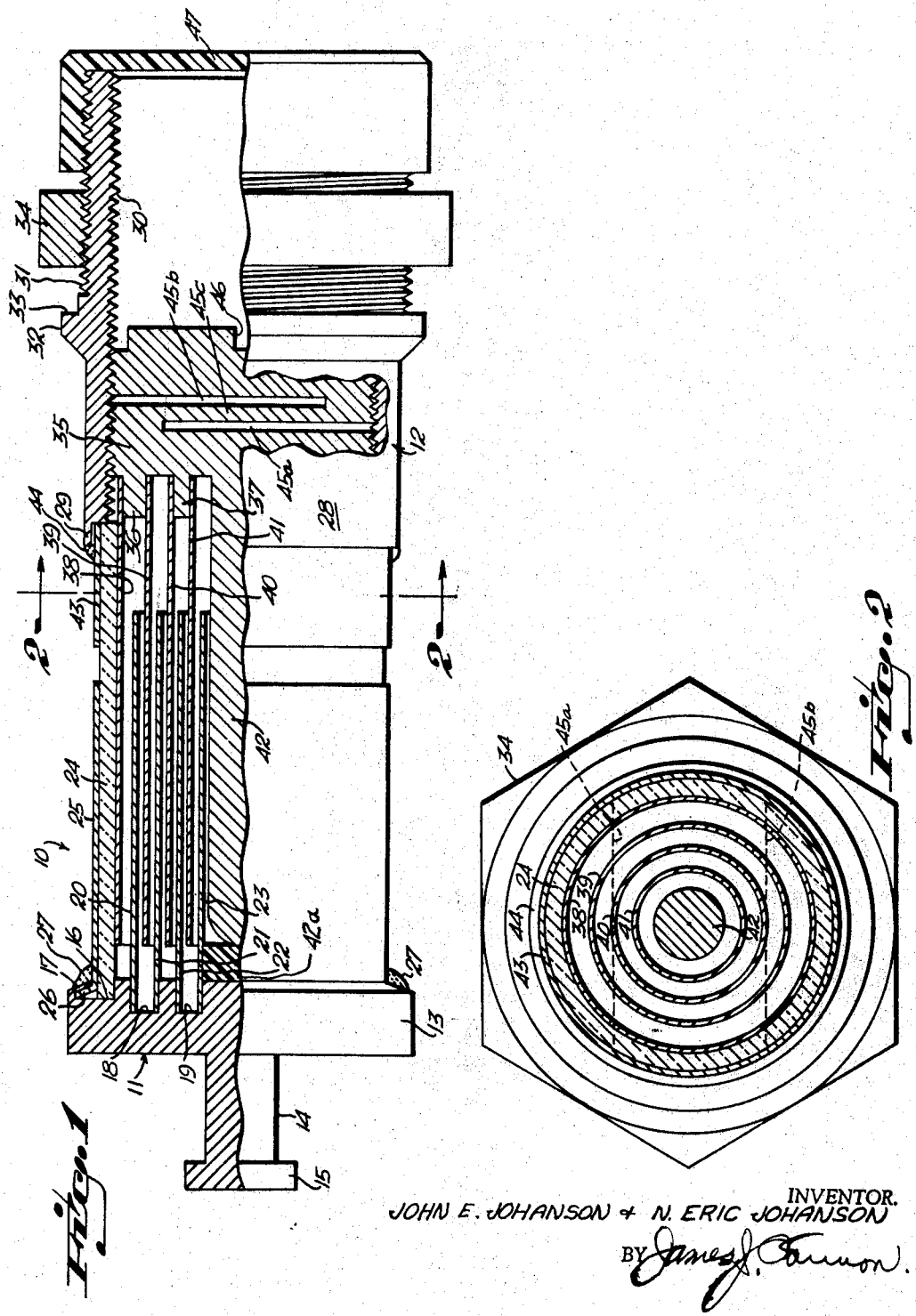
INVENTOR.
JOHN E. JOHANSON & N. ERIC JOHANSON
BY James J. Cannon
ATTORNEY.

United States Patent Office 3,506,894
Patented Apr. 14, 1970

3,506,894
DUAL-DIELECTRIC CAPACITOR
John E. Johanson and Norman Eric Johanson, Boonton, N.J., assignors to Johanson Manufacturing Corporation, Boonton, N.J.
Filed Oct. 23, 1968, Ser. No. 770,017
Int. Cl. H01g 5/14, 5/24
U.S. Cl. 317—251            5 Claims

ABSTRACT OF THE DISCLOSURE

A dual-dielectric tubular capacitor including rotor and stator end members held in axially-spaced relation by means of a ceramic support tube end portions of which are press-fitted in cylindrical openings in said end members, wherein tubular capacitor plates are concentrically arranged in intermeshed relation within the ceramic support tube and secured in place by end portions thereof being press-fitted with respect to annular wall surfaces of annular recesses provided in said rotor and stator members to constitute the air dielectric capacitance portion of the capacitor.

---

This invention relates to electrical capacitors and is directed particularly to a dual-dielectric capacitor wherein air and glass are both used as the dielectric to achieve higher capacitance in a smaller unit.

Heretofore in the manufacture of cylindrical glass trimmer capacitors and the like, increase in capacity was achieved in the same size unit by adding another electrode band at the inside of the glass tube. It is the principal object of the present invention to provide a more compact capacitor for a given range or value of capacitance by combining, with the glass capacitor portion, an air capacitor comprising intermeshed tubular capacitor plate elements coaxially arranged in air within the tubular glass portion thereof and mutually adjustable in the axial direction for combined capacitance adjustment. With such construction not only can a substantial increase in capacitance be achieved in a tubular capacitor of given size, but the resultant Q factor will be increased due to the use of air as the dielectric for the interior portion of the combined capacitance.

Another object is to provide a dual-dielectric capacitor of the above nature which will be comparatively compact, stable and free from backlash in any position of tuning adjustment, and wherein terminal conductors can be soldered directly to the electrodes, thereby achieving shorter electrical paths, of particular importance in VHF applications.

Other objects, features and advantages of the invention will be apparent from the following description when read with reference to the accompanying drawings. In the drawings, wherein like reference numerals denote corresponding parts throughout the several views:

FIG. 1 is a side view, partly in longitudinal section, of a dual dielectric capacitor embodying the invention; and FIG. 2 is a transverse cross-sectional view taken along the line 2—2 of FIG. 1 in the direction of the arrows.

Referring now in detail to the drawings, the variable dual-dielectric capacitor, designated, generally, by the reference numeral 10, comprises a stator support member 11, which is integrally formed of an electrically conductive material such as brass, and a rotor support member 12 of a like material. The stator support member 11 comprises a cylindrical body portion 13 having a coaxial, outwardly-extending, reduced-diameter stem portion 14, the outer end of which has a cylindrical head 15 for receiving an electrical conductor (not illustrated) for connection to the stator of the capacitor in use. The inner end of the cylindrical body portion 14 is formed with a first annular recess 16 defining a thin, peripheral flange 17. The inner end of the cylindrical body portion 13 is also formed with second and third annular recesses 18 and 19, respectively, defining inner and outer concentric annular wall portions within which end portions of tubular stator plate elements 20, 21, 22 and 23, of equal length but of different diameters, are press-fitted in coaxial relation.

A tubular ground-glass or ceramic dielectric and support member 24 is press-fitted at one end with respect to the inner annular wall of the first annular recess 16 of the stator support member 11. An outer tubular stator electrode 25 is circumjacently fitted about the ceramic dielectric and support member 24 and is secured thereto and with respect to the stator support member 11 by having an outwardly-flared inner end portion 26 thereof hooked under the peripheral flange 17 of said stator support member, said peripheral flange being bent down over said outwardly-flared portion as is illustrated in FIG. 1. As means for enhancing the mechanical and electrical interconnection between the stator support member 11 and the tubular stator electrode 25, the junction thereof may be soldered or brazed, as indicated at 27.

The rotor support member 12 comprises a cylindrical body portion 28 formed at its inner end with a peripheral flange 29. The cylindrical body portion 28 is formed with an internally-threaded, through opening 30, and is partially externally threaded along its outer end, as indicated at 31. The external thread 31 extends inwardly to an annular flange 32 formed about the outside of the cylindrical body portion 28 and defining a shoulder 33 cooperative with a hexagonal nut 34 threadable along said external thread for mounting the capacitor in a suitable chassis opening or the like. Threadingly received within the cylindrical body portion 28 is an externally-threaded cylindrical rotor element carrier 35 integrally formed with concentric annular projections 36, 37, defining annular side wall portions press-fitted over which are end portions of tubular rotor elements 38, 39, 40 and 41 of the same length but of graduated diameters. The cylindrical rotor element carrier 35 is also integrally formed with an axial, cylindrical post 42 receivable in spaced, concentric relation within the tubular stator element 23 and cooperative therewith as a rotor electrode. The outer end of the cylindrical post 42 is rounded, and is adapted to abut a cylindrical insulator member 42a fitted at the inner end of the tubular stator element 23 to limit inward movement and prevent possible electrical shorting of the rotor with respect to the stator.

Means is provided for effecting secure frictional interengagement of the rotor element carrier 35 with respect to the rotor support member 12, holding it precisely in its axial or longitudinal position of tuning adjustment. To this end, said carrier is formed along its length with a pair of closely spaced, narrow, transverse slots 45a, 45b, extending inwardly from opposite sides of said carrier to depths substantially greater than its diameter. Prior to assembly of the rotor element carrier 35, it will be axially (longitudinally) deformed by a slight amount whereby the external threaded portions at each side of the slots 45a, 45b, will be displaced slightly out of mutual helical alignment. Upon assembly, the resiliency afforded by the web portion 45c between and defined by the slots 45a, 45b, will permit threaded interengagement of the rotor element carrier 35 in the rotor support member 12 with such axial constrainment of the two threaded sections thereof (as divided by said slots) with respect to the internal threads of said support member as will minimize any possibility of dislodgement from tuned position, tuning being effected by use of a screwdriver in the slot 46 at the outer end of said element carrier.

An end cap 47, preferably of "nylon" or the like, threadable on the outer end of the body portion 28 of the rotor support member 12 is provided for closing off the outer end of the said support member after tuning adjustment of the rotor element carrier 35 to the desired capacitance has been made.

The rotor end of the tubular ceramic dielectric and support member 34 has circumjacently fitted thereon and cemented thereto an outer tubular rotor electrode 43, and said rotor end of said ceramic support member is received, together with the outer end of said outer tubular rotor electrode, within the periperhal flange 29 of the cylindrical body portion 28 whereat its securement and electrical interconnection is enhanced such as by soldering or brazing, indicated at 44, at their juncture. It is to be noted that in its assembly, the tubular rotor element 39 is of such outer diameter as to fit slidingly with respect to the inner surface of the ceramic dielectric and support member 25, whereby said support member serves as a dielectric between the stator and rotor tubular plate elements 25 and 38, respectively.

It will be noted that the tubular stator elements 20, 21, 22 and 23 and the tubular rotor elements 39, 40 and 41 are so arranged and spaced in their respective stator and rotor support members 11 and 12, that they fit in intermeshed or interspaced relation, the stator element 23 also being of such inner diameter as to be radially-spaced from the outer periphery of the axial cylindrical post 42 of the rotor element carrier 35.

Referring to FIGS. 3 and 4, there is illustrated therein a modification of the invention in the form of a variable glass-dielectric capacitor, designated, generally, by reference numeral 48. The variable capacitor 48 comprises a tubular stator member 49 having an end wall 50, the inside of which is fitted with an insulator disc 51. Press-fitted within the stator member 49 is one end of a ground-glass or ceramic dielectric and support tube 52. The opposite end of the support tube 52 is press-fitted within one end of a tubular rotor support member 53, said rotor support member being provided with a flange portion 54 of increased internal diameter for this purpose. The remainder of the rotor support tube 52 is internally threaded, as indicated at 55. Threadingly received within the rotor support tube 52 is a cylindrical rotor 56, externally threaded along its rearward end, as indicated at 57. The threaded portion of the rotor 56 extends forwardly into a central portion 59 of slightly reduced diameter, terminating in a cylindrical end portion 58 of slightly lesser outer diameter than the inner diameter of the ceramic support tube 52 so as to be slidably adjustable along and with respect thereto. The rearward or outer end of the rotor 56 is formed with a head 60 of slightly increased diameter, serving as a stop to limit inward adjustment of said rotor with respect to the stator member 49. A kerf or screwdriver slot 61 at the outer end of the rotor head 60 permits ready adjustment of the depth of the rotor in the stator, and thus adjustment of the capacitance of the capacitor, the ceramic tube 52 acting as the dielectric between the cylindrical end portion 58 and the tubular stator member 49.

While there is illustrated and described herein only two forms in which the invention can conveniently be embodied in practice, it is to be understood that these forms are presented by way of example only and not in a limiting sense.

What we claim is new and desire to secure by Letters Patent is:

1. A dual-dielectric tubular capacitor comprising, in combination, a pair of axially-spaced end members, a tubular ceramic support member, end portions of said ceramic support member being press-fitted in coaxial cylindrical recesses in said end members, a first plurality of tubular plate elements having mutually different diameters press-fitted at end portions thereof with respect to annular wall surfaces of coaxial annular recesses provided in one of said support members, a plurality of second tubular plate elements having mutually different diameters press-fitted at end portions thereof with respect to annular wall surfaces of coaxial annular recesses provided in the other of said support members, said first plurality of plate elements and said second plurality plate elements being disposed in interspaced relation within said ceramic support member, an outer tubular stator element circumjacent said support member and electrically grounded with said one of said support members, the largest diameter one of said second tubular plate elements having an outer diameter only slightly less than the inner diameter of said ceramic support member so as to be slidably adjustable therein and therealong.

2. A dual dielectric tubular capacitor as defined in claim 1, wherein said other of said support members comprises a rotor carrier member, and means for adjustably positioning said rotor carrier member along the axial direction with respect to said one of said support members, said annular recesses of said other of said support members being in said rotor carrier member.

3. A dual-dielectric tubular capacitor as defined in claim 2, wherein said means for adjustably positioning said rotor carrier member comprises a central, internally-threaded through opening in said other of said support members, said rotor carrier member being externally threaded and threadable along said internally-threaded opening.

4. A dual-dielectric tubular capacitor as defined in claim 3 wherein the externally-threaded portion of said rotor carrier member is formed along its length with a pair of closely-spaced, transversely-extending slots directed inwardly of opposed side portions of said carrier member and defining therebetween an interconnecting, yieldable web portion permitting rectilinear axial deformation of the end portions of said carrier member at each side of said web portion.

5. A dual-dielectric tubular capacitor as defined in claim 3, including stop means for limiting inward movement of said rotor carrier member with respect to said internally-threaded opening.

References Cited

UNITED STATES PATENTS 3,336,515   8/1967   Seiden _____ 317—251

ELLIOT GOLDBERG, Primary Examiner

U.S. Cl. X.R.

317—242, 249